ST. CHARLES JACOBS.
VEHICLE.
APPLICATION FILED MAR. 23, 1920.

1,411,277.

Patented Apr. 4, 1922.

INVENTOR
St Charles Jacobs
BY his ATTORNEY
W. T. Criswell

UNITED STATES PATENT OFFICE.

ST. CHARLES JACOBS, OF BROOKLYN, NEW YORK.

VEHICLE.

1,411,277.  Specification of Letters Patent.  Patented Apr. 4, 1922.

Application filed March 23, 1920. Serial No. 368,084.

*To all whom it may concern:*

Be it known that I, ST. CHARLES JACOBS, a citizen of the United States, and a resident of Coney Island, borough of Brooklyn, in the county of Kings and State of New York, have invented a certain new and useful Improvement in Vehicles, of which the following is a full, clear, and exact specification.

This invention relates more particularly to a class of vehicles adapted to be used for children.

My invention has for its object primarily to provide a vehicle designed to be employed for the comfort and amusement of children by permitting a child to be wheeled from place to place as well as allowing the child at the same time to be rocked if desired, and which is also of a form whereby the child may be rocked while the vehicle is at a standstill. This is accomplished mainly by providing a running gear with front and rear axles carrying wheels, and on the running gear is a body of a size adapted to hold one or more children. The body is yieldingly movable to allow the child to be rocked back and forth, and associated with the rear axle and with the body of the vehicle is a mechanism to connect and disconnect the body to the rear axle whereby the body will be rocked when the vehicle is wheeled, or to permit the body to be rocked manually independent of the movement of the vehicle.

A further object of the invention is to provide a child's vehicle of a simple and efficient construction which may be made in any desired shape and size in various designs.

With these and other objects in view, the invention will be hereinafter more particularly described with reference to the accompanying drawing forming a part of this specification in which similar characters of reference indicate corresponding parts in all the views, and will then be pointed out in the claims at the end of the description.

Figure 1:
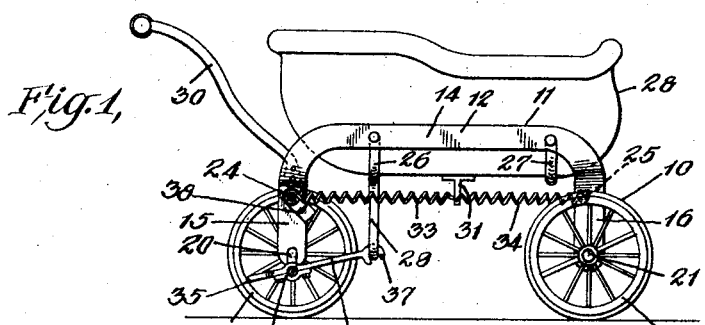

In the drawing, Figure 1 is a side elevation of one form of vehicle embodying my invention, part of the rear portion of the running gear of the vehicle being broken away.

Figure 2:
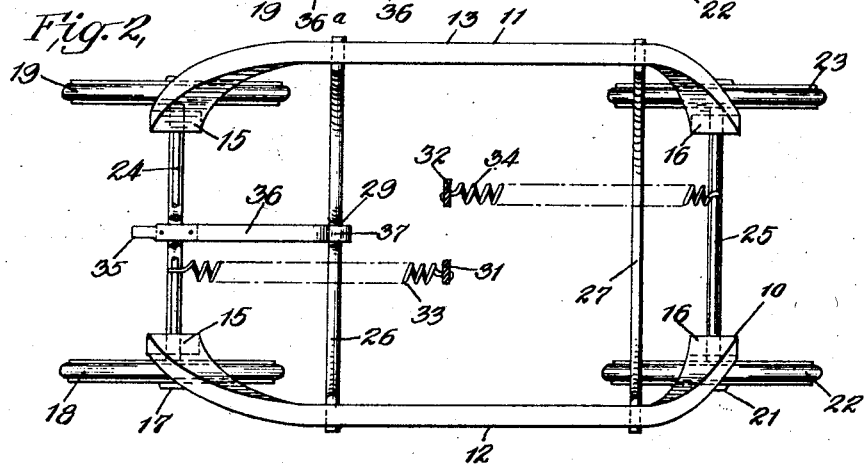
Figure 3:
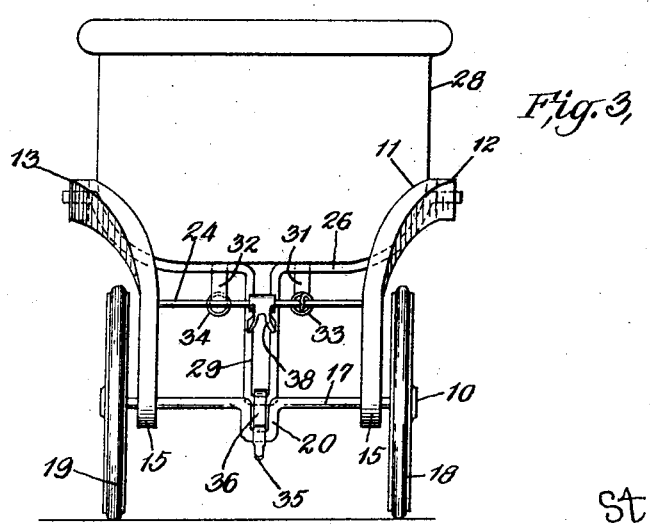

Fig. 2 is an enlarged top plan, partly in section, of the running gear of the vehicle with the handle removed therefrom, and Fig. 3 is an enlarged rear elevation of the vehicle with the handle removed.

The vehicle has a running gear 10 which includes a frame 11 composed preferably of two spaced corresponding side bars 12 and 13. Each of these bars is somewhat arch-shaped to provide a longitudinally disposed bridging member 14 and two legs or arms 15 and 16 both of which depend from the bridging member 14. The side bars 12 and 13 are arranged on alinement, and the pairs of legs 15 and 16 of the bars may be curved inwardly toward each other. In the free end parts of the pair of legs 15 of the side bars is journaled a rear axle 17 carrying wheels 18 and 19, and the central part of this rear axle is bent in somewhat a U-shape fashion to provide a crank, as 20. In the free end parts of the pair of legs 16 of the side bars is journaled a front axle 21 having wheels 22 and 23 on its ends. Also between the legs 15 of the side bars of the frame 11 above the rear axle 17 is a rod 24, while between the legs 16 of the side bars above the front axle 21 is a rod 25.

Between the bridging members 14 of the side bars 12 and 13 of the frame 11 in proximity to the rear legs of these side bars is a transverse bar 26 having its ends rotatably disposed in openings in the side bars so that the transverse bar may swing in the frame, while between the bridging members in proximity to the front legs of the side bars of the frame is a second transverse bar 27 having its ends also rotatably disposed in openings in the side bars so that this second transverse bar may swing in the frame. Both of the swinging transverse bars 26 and 27 may be curved downwardly or concaved, as shown, and on these transverse bars between the side bars of the frame is mounted a body, as 28. The body 28 may be of any suitable type for accommodating one or more children, such as the form illustrated which is commonly used on baby carriages, though the body may be in the form of an animal or the like on which the child may be seated. Extending downwardly from the central part of the concaved swinging transverse bar 26 is a substantially U-shaped extension or bar 29 which is of a length so that its free end extends on a plane approximately on longitudinal alinement with the axles of the vehicle, and to the rod 24 of the frame 11 of the running gear is held one end of a handle, as 30, which may be of a suitable form to allow the vehicle to be wheeled by a person from place to place. Protruding downwardly from the underside of the body 28 between the swinging bars 26 and 27 are two spaced lugs, as 31 and 32. To the lug 31 is held one end of a spiral spring or cushion, as 33, having its second end held to the rod 24, and to the lug 32 is held one end of another spiral spring or cushion 34 having its second end held to the rod 25. These springs are similarly tensioned for normally retaining the body 28 of the vehicle yieldingly between the side bars of the frame 11 as well as serving to also yieldingly limit the swinging of the body and the swinging of the bars 26 and 27.

By pushing or pulling the handle 30 the vehicle may be conveniently wheeled, and serving to cause a rocking movement to be imparted to the body 28 I provide a mechanism, as 35. The mechanism may be of any desired form, though this mechanism is preferably composed of a lever, or trip or bar 36 having its central part fulcrumed, at 36ª, to the crank 20 of the rear axle of the vehicle. The lever 36 is of a length so that one of its ends extends in proximity to the U-shaped depending extension 29 of the swinging bar 26, while the second end of the lever protrudes sufficient distance beyond the rear axle of the vehicle to be readily swung in upwardly and downwardly directions by one of the feet of the person wheeling the vehicle, and the first mentioned end of the lever terminates with a hook, as 37, which is normally in removable engagement with the free end of the U-shaped extension 29 of the swinging bar 26. Thus when the vehicle is wheeled by pushing or pulling the handle 30 the mechanism 35 will be operated with the circumferential swinging of the crank 20 by the rotation of the rear axle 17 of the vehicle. The lever 36 will then be swung back and forth, and the bar 26 with its extension 29 will be likewise swung. A rocking movement will thereby be imparted to the body 28 of the vehicle to cause the occupant of the body to be rocked while being wheeled from place to place.

In order to prevent rocking of the body in this manner, if desired, the mechanism 35 may be disconnected from the body by the lever or trip 36 being swung upwardly for separating the engagement of its hook 37 with the extension 29 of the swinging bar 26, and to enable this lever to be releasably held free of the engagement with the bar, on the rod 24 of the vehicle is provided a clip, as 38, which is preferably in the form of a prong. The free ends of the fingers of the prong or clip 38 are in opposed relation to the U-shaped extension of the swinging bar 26 as well as being positioned to allow the part of the lever at the hook 37 to be admitted into the prong, and the fingers of the prong are so spaced that the lever will be releasably held by the fingers against accidental displacement. The body may then be manually rocked on the frame 11 independently of the wheeling of the vehicle.

In the foregoing description, I have embodied the preferred form of my invention, but I do not wish to be understood as limiting myself thereto as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:—

1. A vehicle comprising a running gear having a rotatable front and rear axles with wheels, a frame mounted on the axles, swinging bars on the frame, a body on the bars for being rocked backwardly and forwardly with the swinging of the bars, a crank on the rear axle of the running gear, a lever fulcrumed to the crank, a hook on the lever, detachably connected to the body whereby the body will be rocked with the rotation of the rear axle when the vehicle is wheeled, and a clip on the frame for releasably holding the lever when detached from the body.

2. A vehicle comprising a running gear having rotatable front and rear axles with wheels, a frame mounted on the axles, swinging bars on the frame, a body on the bars for being rocked backwardly and forwardly with the swinging of the bars, a crank on the rear axle of the running gear, a lever fulcrumed to the crank, a hook on the lever, detachably connected to the body whereby the body will be rocked with the rotation of the rear axle when the vehicle is wheeled, a clip on the frame for releasably holding the lever when detached from the body, and springs associated with the body and said frame whereby the rocking movement of the body may be yieldingly checked.

This specification signed and witnessed this 22d day of March, A. D. 1920.

ST. CHARLES JACOBS.

Witnesses:
M. SORNENSON,
J. FREDERICK CRYER.